US010500505B2

(12) United States Patent
Blayer et al.

(10) Patent No.: US 10,500,505 B2
(45) Date of Patent: *Dec. 10, 2019

(54) TECHNIQUES TO INTERACT WITH AN APPLICATION VIA MESSAGING

(71) Applicant: Facebook, Inc., Menlo Park, CA (US)

(72) Inventors: Oded Blayer, Sunnyvale, CA (US); Ittai Golde, Sunnyvale, CA (US); Ran Makavy, Sunnyvale, CA (US); Amir Rosenfeld, Sunnyvale, CA (US)

(73) Assignee: FACEBOOK, INC., Menlo Park, CA (US)

( * ) Notice: Subject to any disclaimer, the term of this patent is extended or adjusted under 35 U.S.C. 154(b) by 189 days.

This patent is subject to a terminal disclaimer.

(21) Appl. No.: 15/665,900

(22) Filed: Aug. 1, 2017

(65) Prior Publication Data
US 2018/0015365 A1    Jan. 18, 2018

Related U.S. Application Data

(63) Continuation of application No. 15/376,593, filed on Dec. 12, 2016, now Pat. No. 9,751,012, which is a continuation of application No. 13/965,662, filed on Aug. 13, 2013, now Pat. No. 9,553,832.

(51) Int. Cl.
| A63F 13/87 | (2014.01) |
| H04L 12/58 | (2006.01) |
| A63F 13/30 | (2014.01) |
| A63F 13/42 | (2014.01) |
| A63F 13/795 | (2014.01) |

(52) U.S. Cl.
CPC .............. *A63F 13/87* (2014.09); *A63F 13/12* (2013.01); *A63F 13/42* (2014.09); *A63F 13/795* (2014.09); *H04L 51/046* (2013.01); *H04L 51/18* (2013.01); *A63F 2300/537* (2013.01); *A63F 2300/572* (2013.01)

(58) Field of Classification Search
None
See application file for complete search history.

(56) References Cited

U.S. PATENT DOCUMENTS

| 2005/0261032 A1* | 11/2005 | Seo ........................ A63F 13/12 455/566 |
| 2009/0164916 A1* | 6/2009 | Jeong ..................... A63F 13/12 715/753 |
| 2010/0041479 A1* | 2/2010 | Hsu ........................ A63F 13/10 463/36 |
| 2010/0106612 A1* | 4/2010 | Gupta ..................... A63F 13/12 705/50 |

(Continued)

*Primary Examiner* — Jason T Yen

(57) ABSTRACT

Techniques to interact with an application via messaging are described. An apparatus may comprise an application support component and a communication component. The application support component may be operative to generate an image representing a state of an application and to update the state of the application according to a text command. The communication component may be operative to transmit the image to a client device via a messaging system as an image attachment to a first message and to receive a second message from the client device via the messaging system, the second message comprising the text command. Other embodiments are described and claimed.

17 Claims, 14 Drawing Sheets

(56) References Cited

U.S. PATENT DOCUMENTS

| | | | | |
|---|---|---|---|---|
| 2011/0059801 A1* | 3/2011 | Shiigi | .................... | A63F 13/42 |
| | | | | 463/42 |
| 2013/0002683 A1* | 1/2013 | Li | ....................... | G06F 17/211 |
| | | | | 345/473 |

* cited by examiner

TECHNIQUES TO INTERACT WITH AN APPLICATION VIA MESSAGING

CROSS-REFERENCE TO RELATED APPLICATION

This application is a continuation of U.S. patent application Ser. No. 15/376,593 filed Dec. 12, 2016 and entitled "Techniques to Interact with an Application via Messaging," which is a continuation of U.S. patent application Ser. No. 13/965,662 filed Aug. 13, 2013 and entitled "Techniques to Interact with an Application via Messaging," the contents of which is herein incorporated by reference.

SUMMARY

The following presents a simplified summary in order to provide a basic understanding of some novel embodiments described herein. This summary is not an extensive overview, and it is not intended to identify key/critical elements or to delineate the scope thereof. Its sole purpose is to present some concepts in a simplified form as a prelude to the more detailed description that is presented later.

Various embodiments are generally directed to techniques to interact with an application via messaging. Some embodiments are particularly directed to techniques to carry out a multiplayer gaming session via an instant messaging system. In one embodiment, for example, an apparatus may comprise an application support component and a communication component. The application support component may be operative to generate an image representing a state of an application and to update the state of the application according to a text command. The communication component may be operative to transmit the image to a client device via a messaging system as an image attachment to a first message and to receive a second message from the client device via the messaging system, the second message comprising the text command. Other embodiments are described and claimed.

To the accomplishment of the foregoing and related ends, certain illustrative aspects are described herein in connection with the following description and the annexed drawings. These aspects are indicative of the various ways in which the principles disclosed herein can be practiced and all aspects and equivalents thereof are intended to be within the scope of the claimed subject matter. Other advantages and novel features will become apparent from the following detailed description when considered in conjunction with the drawings.

DETAILED DESCRIPTION

Figure 1:
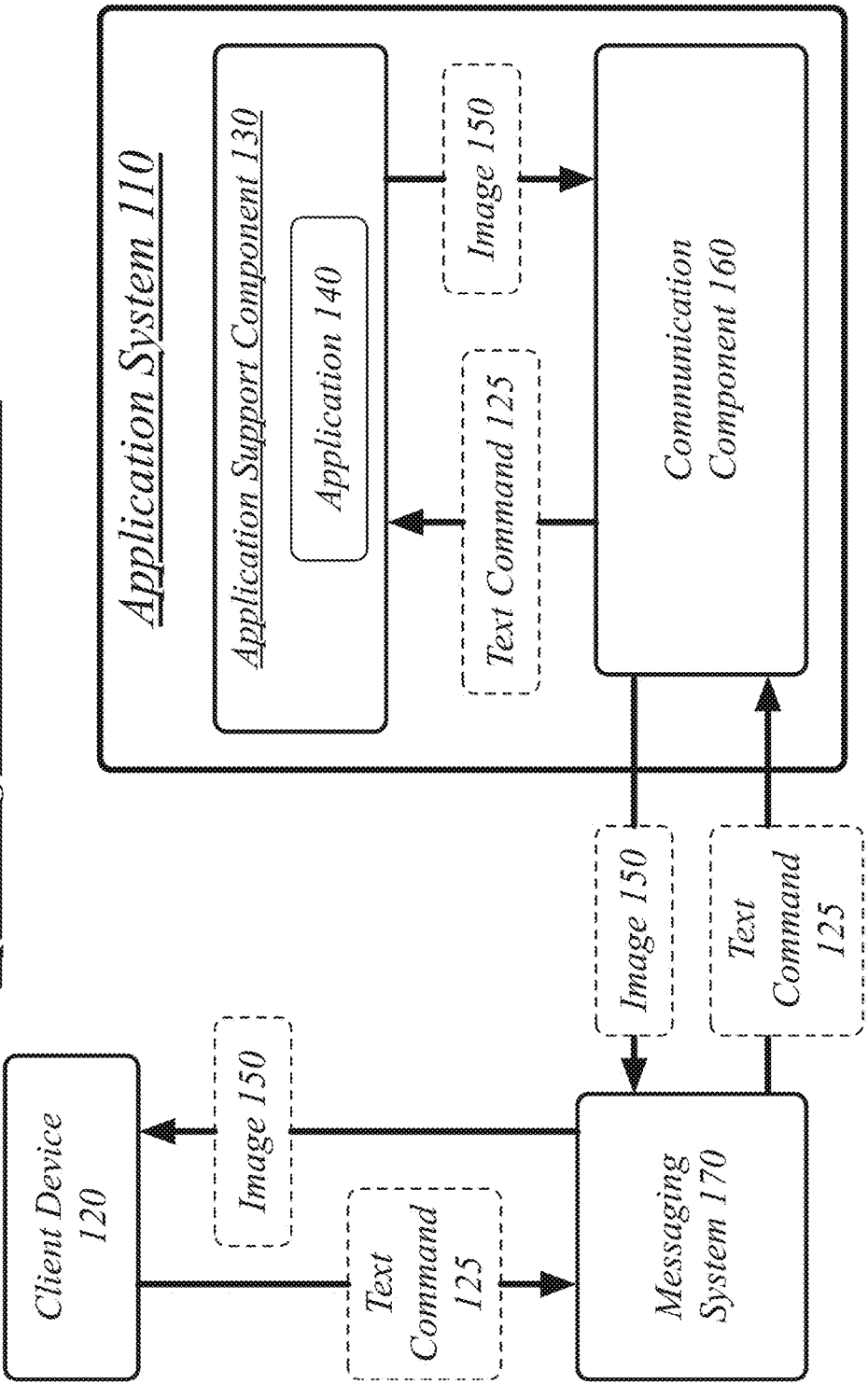
FIG. 1 illustrates an embodiment of an application system.

Various embodiments are directed to techniques to interact with an application via messaging. Messaging systems empower the exchange of images and text between users. While this may be used for the purpose of interpersonal communication, this messaging may also be extended by an intermediary to provide additional services to users of a messaging service. In particular, this extension may be focused entirely on additional functionality that can be implemented entirely by the intermediary without modifying the messaging client. By relying only on a messaging client ability to receive and transmit text and images the additional functionality can be provided to existing users of a messaging service without needing a new messaging client. Some users may be messaging on devices which do not support custom or third-party clients, such as users of feature phones, mobile cellular devices which come with a predefined set of user applications and utilities. Further, even those users with devices which may support third party applications may resist installing such an application due to the time required, perceived inconvenience, lack of technical knowledge, or lack of awareness of the option. By implementing the additional functionality entirely in a messaging intermediary additional users may therefore be served by the service, both bringing them in as clients of the service and expanding the pool of partners for those already using the service.

As a result, the embodiments can improve the interoperability of an enhanced messaging system and increase the convenience of using the enhanced messaging system for its users.

Reference is now made to the drawings, wherein like reference numerals are used to refer to like elements throughout. In the following description, for purposes of explanation, numerous specific details are set forth in order to provide a thorough understanding thereof. It may be evident, however, that the novel embodiments can be practiced without these specific details. In other instances, well known structures and devices are shown in block diagram form in order to facilitate a description thereof. The intention is to cover all modifications, equivalents, and alternatives consistent with the claimed subject matter.

FIG. 1 illustrates a block diagram for an application system 110 in an operating environment 100. In one embodiment, the application system 110 may comprise a computer-implemented application system 110 comprising one or more components. Although the application system 110 shown in FIG. 1 has a limited number of elements in a certain topology, it may be appreciated that the application system 110 may include more or less elements in alternate topologies as desired for a given implementation.

The application system 110 may be generally arranged to act as an intermediary within a messaging system to receive, modify, and retransmit messages on the messaging system 170 so as to insert an interaction between an application 140 and a user into a messaging-based conversation. The application system 110 may comprise an application support component 130 and a communication component 160.

The application support component 130 may be operative to generate an image 150 representing a state of an application 140 and to update the state of the application 140 according to a text command 125.

The application 140 may comprise any application, application module, or otherwise distinct set of rules embodying interactive behavior with one or more users. For instance, the application 140 may comprise a game. The application 140 may specifically comprise a multiplayer game being played by a pair of players, wherein the pair of players are two users interacting via a messaging system 170. The game may be a turn-based game wherein one or more players take turns—such as alternating or rotating through turns in a multiplayer game—selecting moves within that game, having the game updated according to their move, and then continuing onto the next player. In some instances, one or more of the players may be an artificial intelligence (AI) player in which moves are selected by a computer. A pair of players may communicate over a messaging system, exchanging interpersonal messages as normal, and play a two-player game using the same messaging system over the same messaging channel, interleaving the submission of user-to-user messages and text commands and receiving both user-to-user messages and updates game states via representative images.

The text command 125 may comprise any command receive from a user as text operative to be used as input the application 140. For instance, if the application 140 is a game, the text command 125 may comprise a player's move in the game. If the game is a multiplayer game between at least a first player and a second player, the text command 125 may comprise the first player's move in the multiplayer game.

The generated image 150 may be an image visually representing the state of the application 140 according to a predefined layout. The image 150 may correspond to what would be displayed for a user if the application 140 were built to display using a conventional user interface rather than over a messaging system. For instance, if the application 140 is a game, the image 150 may be a rendered view of a game board, play area, or other predefined perspective on the game.

The communication component 160 may be operative to transmit the image 150 to a client device 120 via a messaging system 170 as an image attachment to a first message and to receive a second message from the client device 120 via the messaging system 170, the second message comprising the text command 125. The messaging system 170 may be operative to convey text-based messages, image-based messages, and/or messages containing both text and image. An image attachment may refer to any technique for sending an image via a messaging system 170. The exchange of the text command 125 and the image 150 may comprise a single back-and-forth interaction between a user of client device 120 and the application 140: the application support component 130 generates the image 150 representing the state of the application 140, the image 150 is transmitted to the client device 120 by the communication component 160, the communication component 160 receives a response from the user to the current application state as the text command 125, and the application support component 130 updates the application 140 from its current state to the new state according to the received text command 125.

Figure 2:
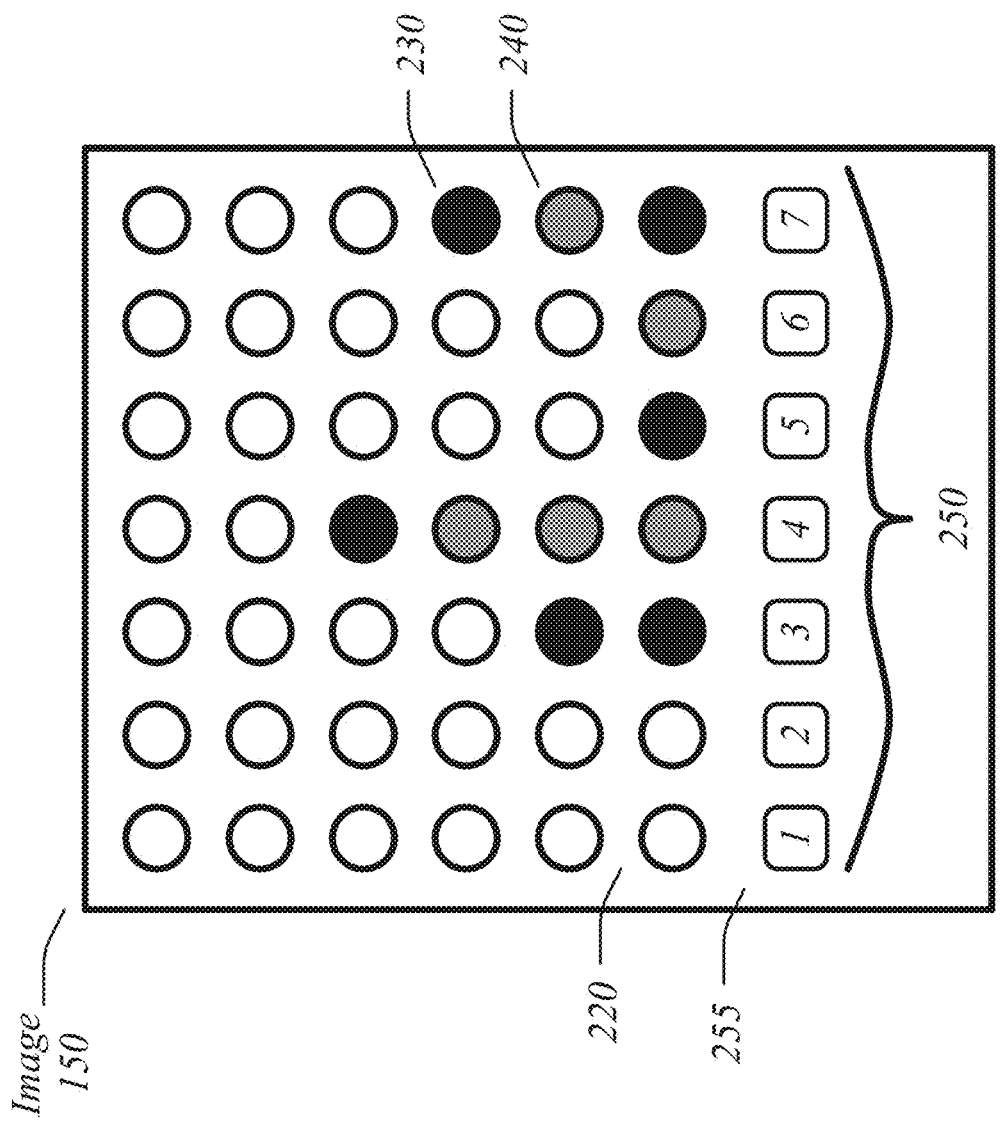
FIG. 2 illustrates an exemplary image representing the status of an application with a legend.

FIG. 2 illustrates an image 150 representing the status of an application 140 support by the application system 110. As shown in FIG. 2, the example game is Captain's Mistress (popularly known as the Connect Four™ game published by Milton Bradley™).

The image 150 shows a current state of a turn-based multiplayer board game. A seven by six grid of spaces is available for play. The grid is initially empty and two players take turns claiming spaces, with the requirement that for any given column a lower space must be filled before a higher one. The winner is the first player to fill four space in a line—horizontal, vertical, or a forty-five degree diagonal—with tokens of their color. The image 150 depicts a game already in progress, with a large number of empty spaces such as space 220, six spaces filled by the player using black tokens such as space 230, and five spaces filled by the player using grey tokens such as space 240. At this state in the game neither player has yet won.

The image 150 includes a legend 250 visually indicating a set of available commands. As a player's move may be completely communicated by specifying which column they desire to play in, seven moves are possible corresponding to the seven columns. The legend 250 associates each column with a number, which number may be entered as a text command 125 in order to make a play in the game to place a piece at the lowest spot in the associated column. For instance, if the grey player were given the next opportunity to play and received image 150 to communicate to them the current state of the game and their play options, they could enter and send "1" as the text command to play a piece in the lowest space of the first column, at the indicated space 220. This is communicated to them by legend element 255 which includes the text command for making a play at the visually-associated first column.

Figure 3:
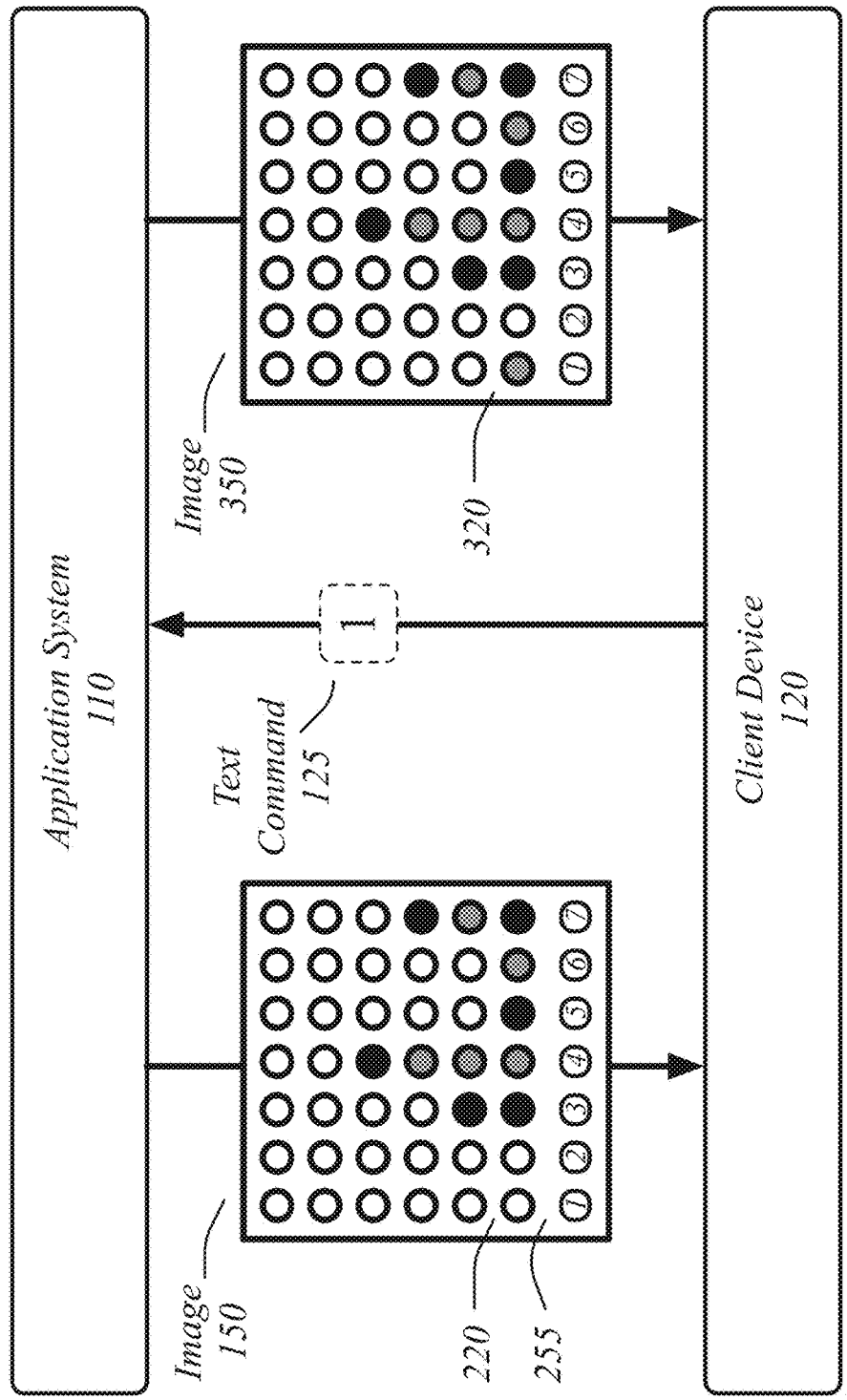
FIG. 3 illustrates an embodiment of an operational environment for the application system in which two images are transmitted.

FIG. 3 illustrates an embodiment of an operational environment 300 for the application system 110. Shown in FIG. 3 is an example interaction between the application system 110 and the client device 120.

As shown, the application system 110 transmits the image 150 to the client device 120 to indicate the current state of the application 140, in this case a game of Captain's Mistress. The client device 120 displays the image 150 for a user of the client device 120, the user enters a text command 125, and the text command 125 is broadcast from the client device 120 to the application system 110. In this instance, the user has selected to make a player in the first column by sending the text command 125 "1", which corresponds to the first column as illustrated by legend element 255 of the legend 250.

The application support component 130 updates the state of the application 140 according to the text command 125 "1". This inserts a grey game piece 320 at the bottom of the first column. The applications support component 130 renders this new game state of application 140 to produce image 350 representing the new, updated state of application 140. Image 350 is then transmitted to the client device 120 by the communication component 160. This may allow the user of client device 120 to see the updated state resulting from their play. In some embodiments, such as in a multiplayer game, the image 350 may instead be sent to a device being used by the opponent of the player using client device 120. In some embodiments, the image 350 may only be sent to the opponent—as the player having just moved already knows their move and does not need to react to the game state represented by image 350—or may be sent to both the opponent and the player on client device 120.

It will be appreciated that while the depicted sequence of events is that the image 150 is transmitted to the client device 120 and that the text command 125 is received in response, that the images are generated in response to the text commands by the application system 110. The depicted transaction in which an image 150 is responded to by a text command 125 is one cycle in a continuing cycle of interactions between a user on a client device 120 and the application system 110. In particular, this cycle will generally be initiated by the user of the client device 120 rather than the application system 110. For example, the user may use the client device 120 to transmit a text command 125 to the application system 110 to initiate the cycle of interaction described herein.

Where the application system 110 supports a plurality of applications, each application may have associated with it a text command for the initiation of an interaction with that application. In response to receive an initiation text command, the application system 100 may be operative to transmit an initial image to a user to begin the cycle of interaction. If the application 140 is a single-user application, the initial image may be sent to the initiating user. If the application 140 is a multi-user application, such as a multiplayer game, the initial image may be sent to a particular one of the users or players as defined by the application, which may use either deterministic or random techniques to determine a first user or player. If the application 140 is a multi-user application then in some embodiments all users must either send a text command or consent to joining the application. In other embodiments any member of a chat may initiate an application, such as a game, in which all members of the chat will be included.

Figure 4:
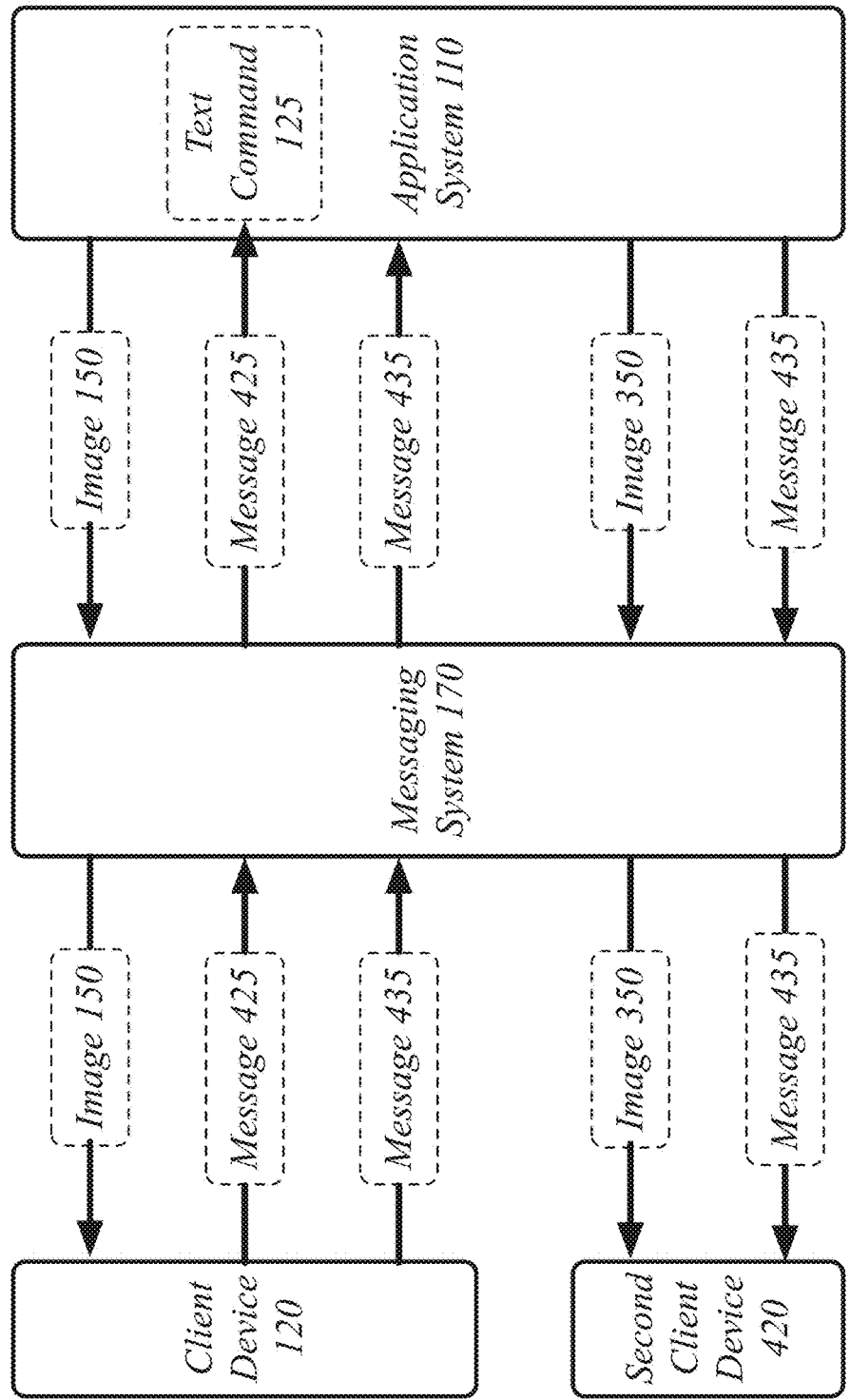
FIG. 4 illustrates an embodiment of an operational environment for the application system including a series of interactions with a first and second client device.

FIG. 4 illustrates an embodiment of an operational environment 400 for the application system 110. As shown in FIG. 4, the application system 110 is engaging in a series of interactions with the client device 120 and a second client device 420.

The client device 120 may be used by a first player in a multiplayer game and the second client device 420 may be used by a second player in the multiplayer game. The client device 120 and the second client device 420 may be substantially similar devices or may be significantly different devices. The client device 120 and the second client device 420 may be any type of devices capable of communicating via the messaging system 170.

The messaging system 170 may comprise any type of messaging system. The messaging system 170 may comprise a text-messaging system with the various messages exchanged via the messaging system 170 comprising text messages, some of which include image attachments. The messaging system 170 may comprise an instant-messaging system with the various messages exchanged via the messaging system 170 comprising instant messages, some of which include image attachments. The messaging system 170 may comprise a social-networking messaging system with the various messages exchanged via the messaging system 170 comprising messages sent via a social network, some of which include image attachments. In some embodiments, the social network may comprise both the messaging system 170 and the application system 110 or may comprise some portion of the messaging system 170 and the application system 110.

While the messaging system 170 and application system 110 are illustrated as discrete elements, it will be appreciated that the messaging system 170 and application system 110 may be maintained by the same entity and may work in unison as part of the same messaging service. Alternatively or additionally, the messaging system 170 may work in cooperation with the application system 110 to support the additional functionality provided by the application system 110. For instance, users may be able to opt-in with the messaging system 170 to have their messages passed through the application system 110 in order to receive the benefit of the functionality provided by the application system 100. Alternatively, users may register with the application system 110 to exchange messages with other users with the application system 110 handling redirection of interpersonal communication back through the messaging system 170. This may occur without the knowledge of the messaging system 170. For instance, the application system 110 may comprise a portion of a social networking system wherein the social networking system empowers messaging between users of the social networking system and provides the functionality of the application system 110 in addition.

The application system 110 may transmit the image 150 to the client device 120 using the messaging system 170. The application system 110 may receive a first message 425 and a second message 435 from the client device 120 via the messaging system 170. The first message 425 may comprise the text command 125 which may be used to update the state of the application 140, resulting in image 350 representing the updated state of the application 140. The second message 435 may comprise an interpersonal communication from the user of the client device 120 to the user of the second client device 420. The communication component 160 may be operative to determine that the first message 425 comprises the text command 125 from a set of available commands. The set of available commands may correspond, and may correspond on a one-to-one basis, with the commands communicated via the legend 250. The communication component 160 may be operative to determine that the second message 435 does not correspond to the set of available commands. A message may correspond to the set of available commands if any portion of the message matches exactly to one of the available commands, if the entirety of the text of the message matches exactly to one of the available commands, if an initial portion of the text of the message matches exactly to one of the available commands, or any other known technique for comparing a piece of text to a set of pieces of text for matching. For instance, if the initial portion of a message, such as the first word of a message, corresponds exactly to the set of available commands then that initial portion may be used as the text command 125 with the remaining portioning interpreted as interpersonal communication and forwarded to the other player.

The communication component 160 may send the image 350 representing the new application state to the second client device 420. If application 140 is a multiplayer game, image 350 may represent the game state for the user of the second client device 420 to respond to in making their move. As message 435 was identified as interpersonal communication the message 435 is forwarded from the application system 110 to the second client device 420 over messaging system 170 unchanged so as to allow for banter, chat, or similar side-talk during the playing of the game. In some embodiments, the communication component 160 may be operative to identify all received messages as interpersonal communication if the sender is not eligible to submit text commands because it's another player's turn.

Figure 5:
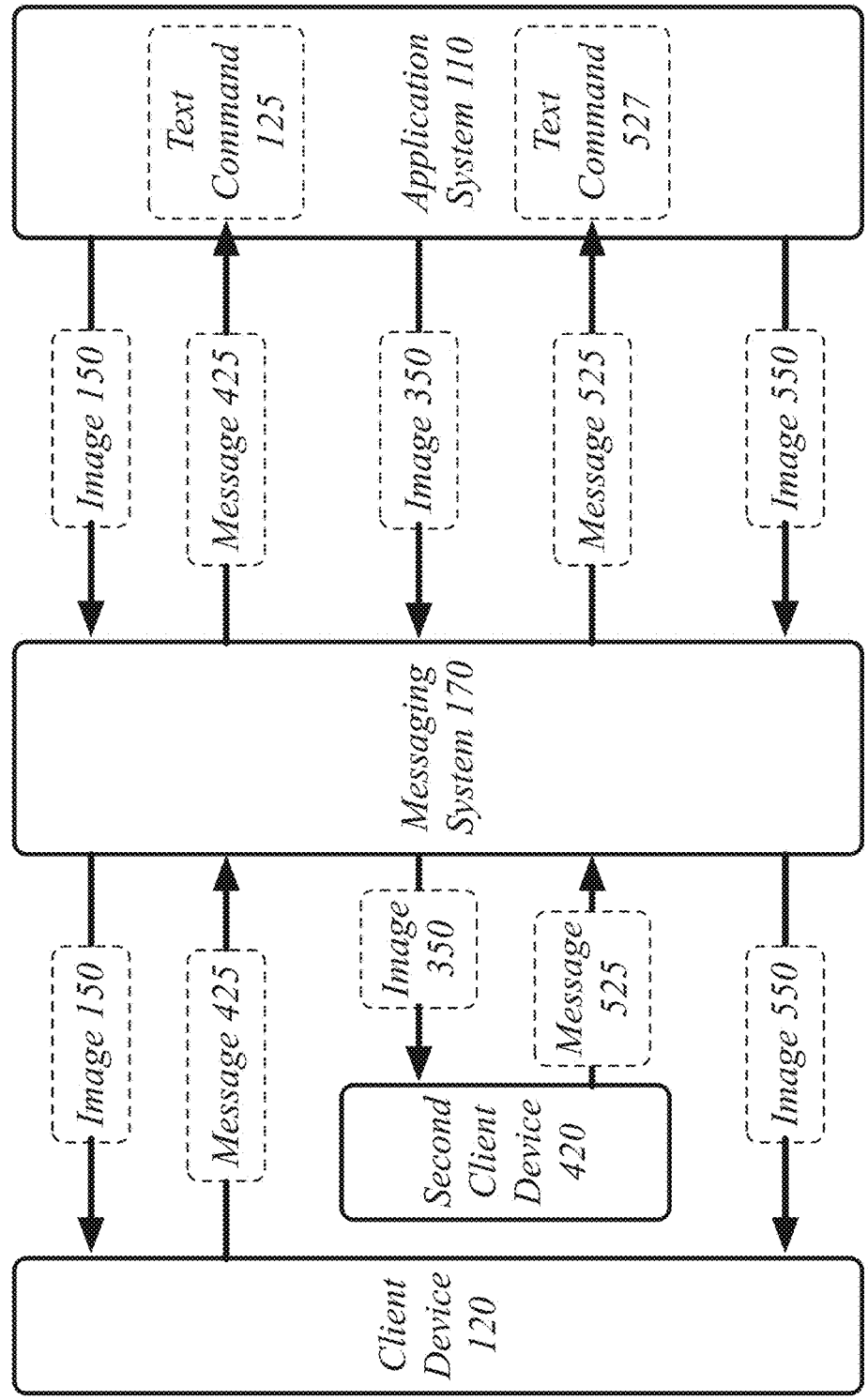
FIG. 5 illustrates another embodiment of an operational environment for the application system including a series of interactions with the first and second client devices.

FIG. 5 illustrates an embodiment of an operational environment 500 for the application system 110. As shown in FIG. 5, the application system 110 is engaging in a different example series of interactions with the client device 120 and a second client device 420.

As before, the application system 110 transmits image 150 to the client device 120 and receives in response message 425 comprising text command 125, which it uses to produce image 350 representing the updated application state. The second client device 420 may receive image 350, display image 350 for a user, and receive a second text command 527 from the user. The second client device 420 may transmit the second text command 527 to the application system 110 via messaging system 170. Communication component 160 may receive message 525 from the second client device 420 and identify that the message 525 comprises the text command 527 corresponding to the set of available commands for the application 140. The application support component 130 may then be operative to update the state of application 140 according to the text command 527 and to generate a third image 550 representing this newer, updated application state. The communication component 160 may then transmit the image 550 to the client device 120 via the messaging system 170.

As such, the application system 110 may be operative to work in conjunction with messaging system 170 to provide a turn-based multiplayer game to the users of the client device 120 and the second client device 420. The users of the devices alternatingly receive images representing the current state of a multiplayer game and submit text commands embodying their move so as to carry out the alternating turns of the players. It will be appreciated that while the illustrated example only shows two client devices with two players, that any number of players and devices may be supported so as to allow for turn-based games with more players.

Figure 6A:
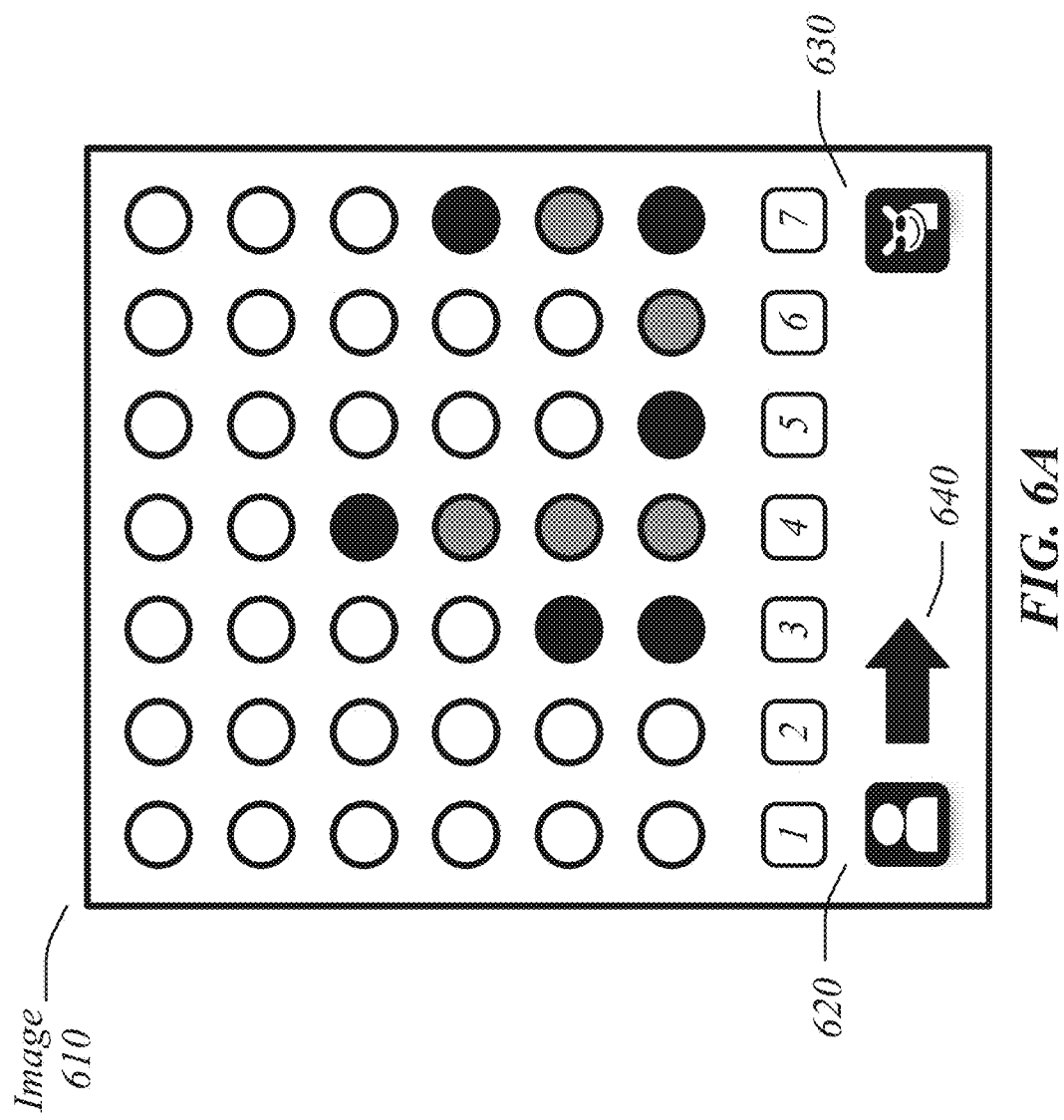
FIG. 6A illustrates an exemplary image representing the status of an application with avatars.

FIG. 6A illustrates an image 610 representing the status of an application 140 support by the application system 110. As shown in FIG. 6A, the image 620 includes a visual representation of whose move the image 610 represents.

Each of the players in a multiplayer game may have associated with them an avatar, user icon, or other image used to represent them. These images may be registered with either the messaging system 170, the application system 110, a social networking system, or any other system involved in the support of application 140. These images may be photographs, cartoons, drawings, or any other visual representation which literally depicts, symbolically represents, or for any reason has been selected as being associated with a user.

As shown in FIG. 6A, these avatars may be used to visually communicate which player made the move which resulted in the application state represented by an image. For instance, the first player may be the user of the first client device 120 and the second player may be the user of the second client device 420. Image 610 may represent the same game state as image 150, an image generated in response to the second player making a movie, the image 610 transmitted to the client device 120 in order for the first player to make their move. The first player using client device 120 may have associated with them avatar 630, which may be a cartoonish drawing. The second player using the second client device 420 may have associated with them avatar 620, which may be a photograph of the second player. The image 610 may include icon 640, in this instance an arrow, indicating that the second player, represented by avatar 620, played a move to produce the game state represented by image 610. This image 610 may include this information to inform the first player that it is their turn to move. This may be of particular value where each player receives the image 610 to indicate the current game state.

Figure 6B:
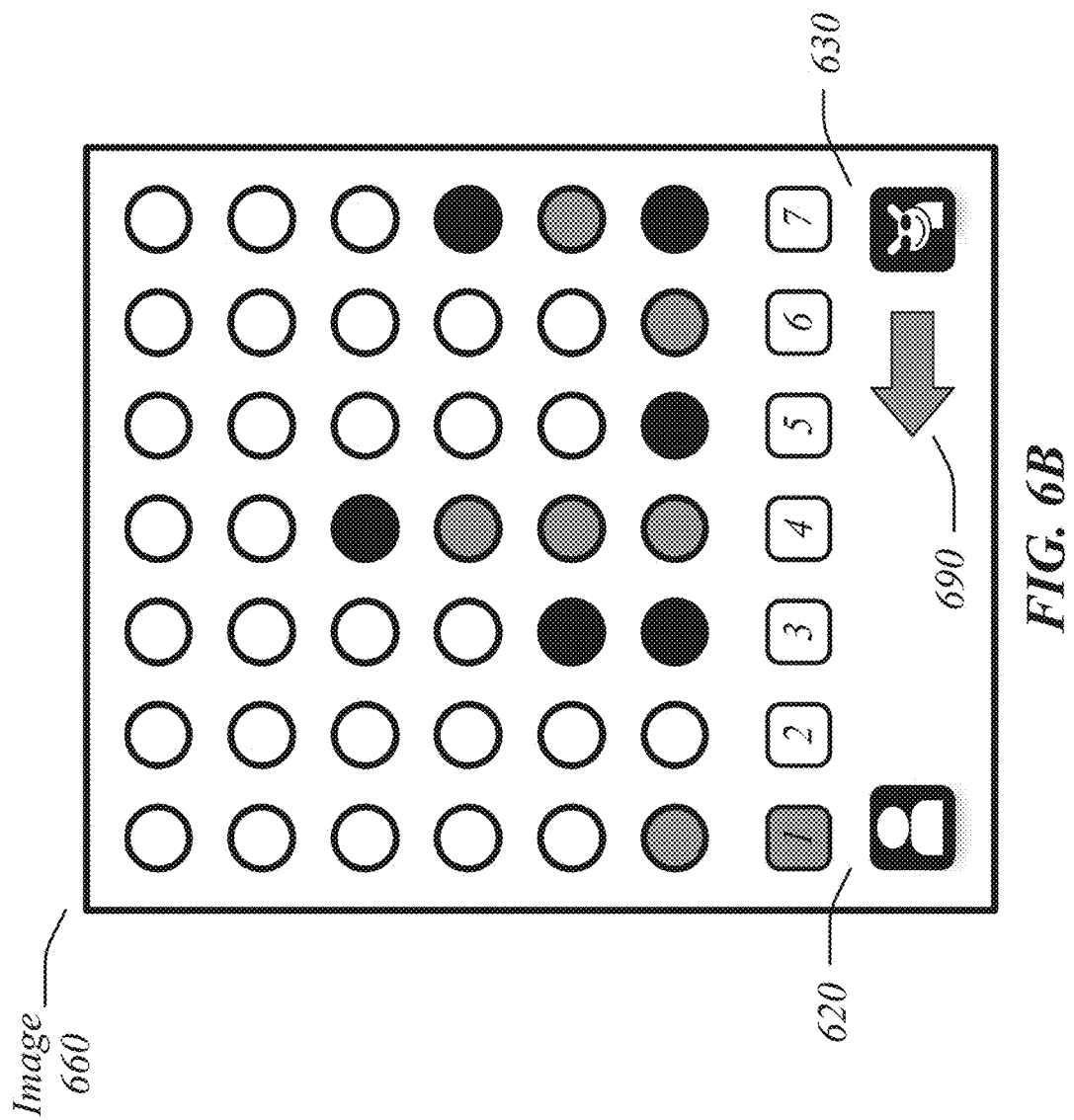
FIG. 6B illustrates an exemplary image representing the status of an application in which the most recent move is visually indicated.

FIG. 6B illustrates an image 660 representing the status of an application 140 support by the application system 110. As shown in FIG. 6B, the image 660 includes a visual representation of whose move the image 660 represents and what move was taken.

Image 660 may correspond to the same game state as image 350, wherein it incorporates the changes to the game state engendered by the text command 125 to play a piece in the first column. Image 660 includes icon 690 indicating that the first player, with avatar 630, made the most recent play. Image 660 also includes modified element 680 of legend 250, the modified element 680 colored with the grey color associated with the first player to indicate that not only was the first player the last one to play, but specifically what play the first player made.

As such, the applications support component 130 may be operative to include one or more avatars in a generated image 660 to represent one or more players of a game. The application support component 130 may be operative to indicate in the generated image 660 which of the one or more players was the last to input a move that updated the game state, such as by including an icon 690 in image 660, the icon 690 visually associated with the avatar 620 for the most recent player to move. The application support component 130 may be operative to indicate in the generated image 660 what move was taken by the most recent payer to move, the most recent move explicitly indicated visually in addition to being indicated implicitly through the updated game state. The most recent move may be indicated explicitly by, for example, modifying the legend 250 to indicate which element 680 of the legend 250 corresponds to the most recent move.

Figure 7A:
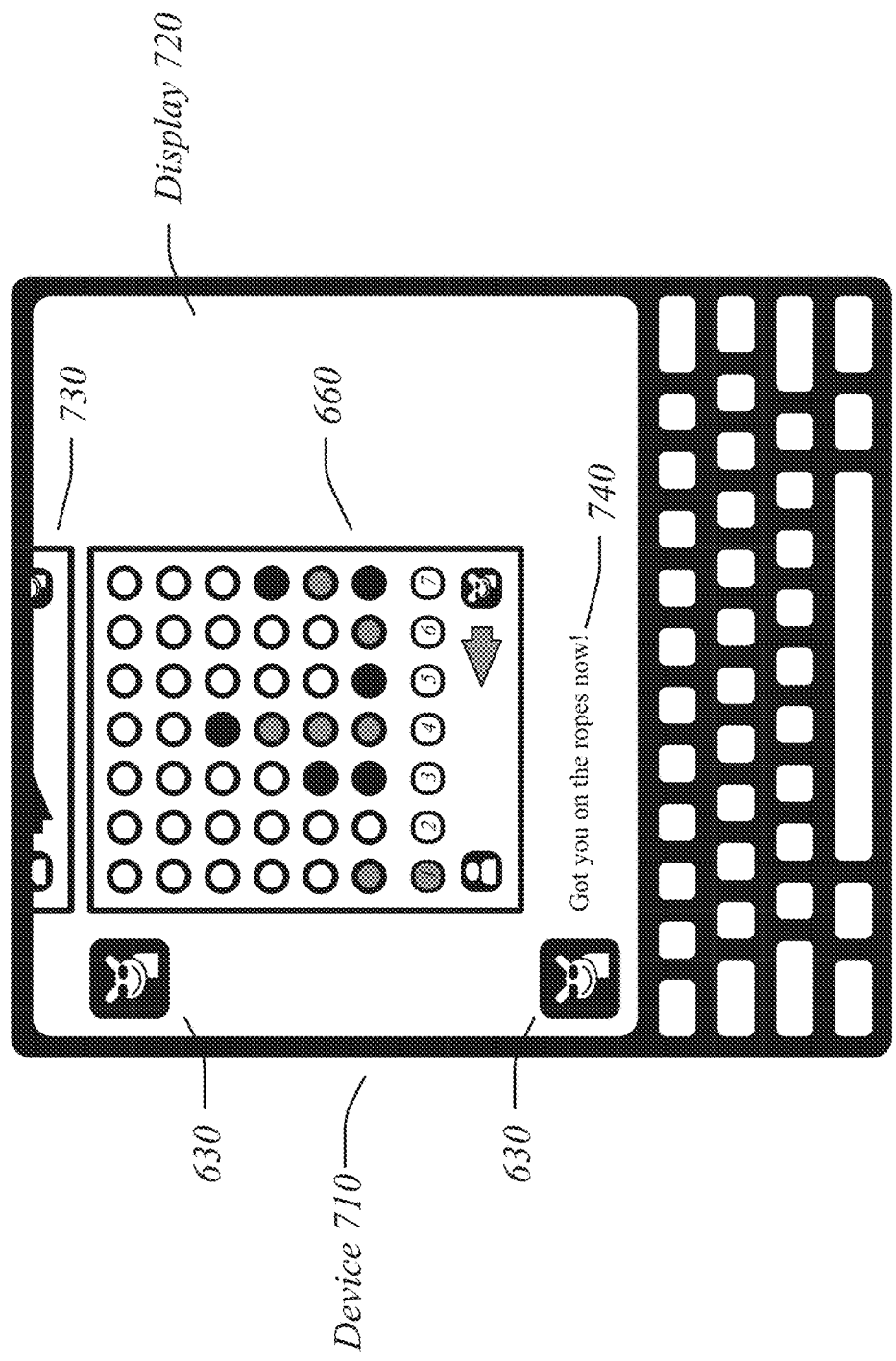
FIG. 7A illustrates an exemplary device displaying images and messages communicated via the application system.

FIG. 7A illustrates an exemplary device 710 which may be used in association with the application system 110. Device 710 may comprise a display 720 for displaying information, including one or more messages, to a user of the device 710.

Device may correspond to the second client device 420 used by the second player, the player with the photographic avatar 620. As shown in FIG. 7A the device 710 has received multiple messages, some text-based interpersonal communication from the first player and some images generated by the application system 110 to communicate the current game state. Image 730 may be a partial portion of image 610 with the remainder having scrolled off the screen. Image 610 may have been received by device 710 to indicate to the second player what their move was and to show them the updated game state after their move.

Below image 730 is shown image 660, the updated game state after a move by the first player. Image 660 is displayed by device 710 with avatar 630 for the first player. The application system 110 may be operative to transmit the message including image 660 via the messaging system 170 as if it were sent by the first player in order to ease the task of device 710 associating the message with the ongoing conversation between the two players. This may serve to make the interference of the application system 110—wherein a text command 125 is removed from the conversation and image 660 is inserted into the conversation in its place—invisible to the device 710.

Device 710 has further received interpersonal communication 740 "Got you on the ropes now!" which is chat associated with the ongoing multiplayer game. Interpersonal communication 740 may correspond to message 435 which was identified by the communication component 160 as not being a text command. Message 435 comprising interpersonal communication 740 was forwarded to device 710 so as to allow for banter between players in addition to the exchanged commands and images comprising the multiplayer game.

Figure 7B:
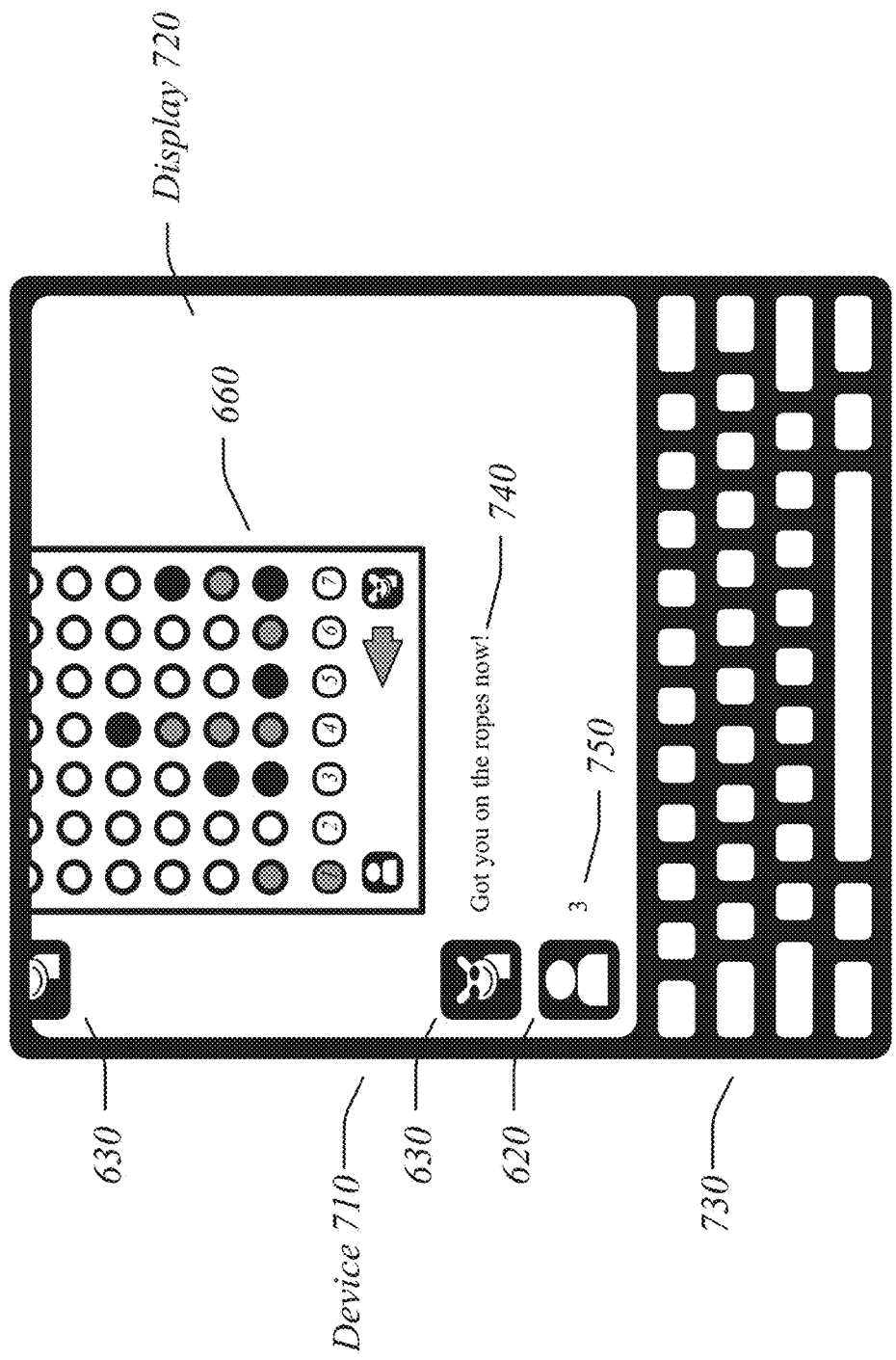
FIG. 7B illustrates an update to the exemplary device of FIG. 7A.

FIG. 7B illustrates an updated display on the exemplary device 710 of FIG. 7A.

The second player, the player associated with avatar 620, may enter into device 710 their responding play to the move by the first player. While the illustrated device 710 includes a physical keyboard 730, it will be appreciated that any form of text entry may be used, including, without limitation, physical keyboard, virtual keyboard, on-screen keyboards, numeric keypads, number-to-letter schemes using numeric keypads, voice recognition, or any other known technique for text entry.

In the illustrated example, the second player has entered "3," displayed on display 720 as message 750. It will be appreciated that while the message "3" is displayed on device 710 that it will be intercepted by the application system 110 and replaced with a generated image representing the game state after the text command "3" is applied to application 140. For instance, note that FIG. 7A depicts a sequence of images without the text command 125 "1" displayed as the "1" was replaced by the image 660 indicating the updated game state. As such, client device 120 would not receive the text command 750 "3", but would instead receive an image.

Figure 8:
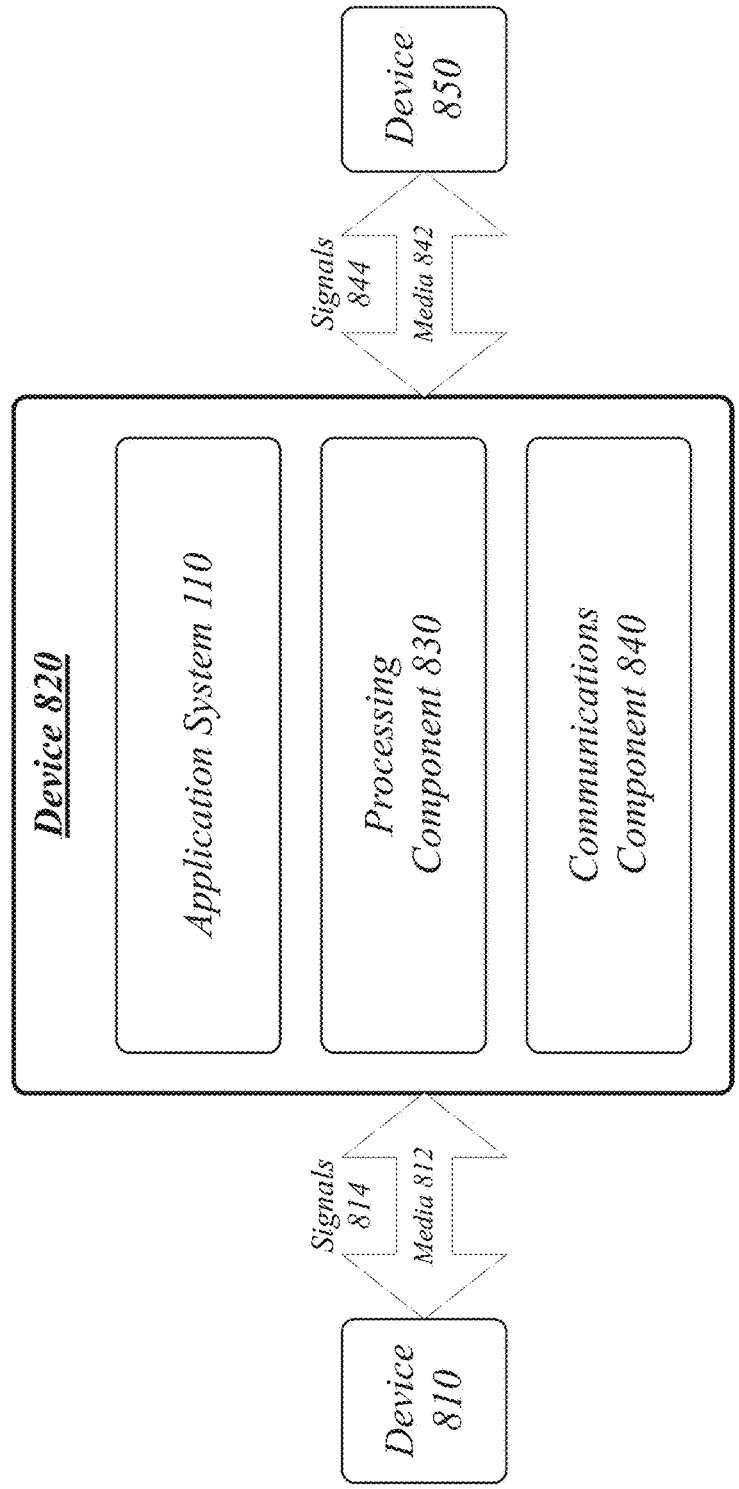
FIG. 8 illustrates an embodiment of a centralized system for the application system of FIG. 1.

FIG. 8 illustrates a block diagram of a centralized system 800. The centralized system 800 may implement some or all of the structure and/or operations for the application system 110 in a single computing entity, such as entirely within a single device 820.

The device 820 may comprise any electronic device capable of receiving, processing, and sending information for the application system 110. Examples of an electronic device may include without limitation an ultra-mobile device, a mobile device, a personal digital assistant (PDA), a mobile computing device, a smart phone, a telephone, a digital telephone, a cellular telephone, ebook readers, a handset, a one-way pager, a two-way pager, a messaging device, a computer, a personal computer (PC), a desktop computer, a laptop computer, a notebook computer, a netbook computer, a handheld computer, a tablet computer, a server, a server array or server farm, a web server, a network server, an Internet server, a work station, a mini-computer, a main frame computer, a supercomputer, a network appliance, a web appliance, a distributed computing system, multiprocessor systems, processor-based systems, consumer electronics, programmable consumer electronics, game devices, television, digital television, set top box, wireless access point, base station, subscriber station, mobile subscriber center, radio network controller, router, hub, gateway, bridge, switch, machine, or combination thereof. The embodiments are not limited in this context.

The device 820 may execute processing operations or logic for the application system 110 using a processing component 830. The processing component 830 may comprise various hardware elements, software elements, or a combination of both. Examples of hardware elements may include devices, logic devices, components, processors, microprocessors, circuits, processor circuits, circuit elements (e.g., transistors, resistors, capacitors, inductors, and so forth), integrated circuits, application specific integrated circuits (ASIC), programmable logic devices (PLD), digital signal processors (DSP), field programmable gate array (FPGA), memory units, logic gates, registers, semiconductor device, chips, microchips, chip sets, and so forth. Examples of software elements may include software components, programs, applications, computer programs, application programs, system programs, software development programs, machine programs, operating system software, middleware, firmware, software modules, routines, subroutines, functions, methods, procedures, software interfaces, application program interfaces (API), instruction sets, computing code, computer code, code segments, computer code segments, words, values, symbols, or any combination thereof. Determining whether an embodiment is implemented using hardware elements and/or software elements may vary in accordance with any number of factors, such as desired computational rate, power levels, heat tolerances, processing cycle budget, input data rates, output data rates, memory resources, data bus speeds and other design or performance constraints, as desired for a given implementation.

The device 820 may execute communications operations or logic for the application system 110 using communications component 840. The communications component 840 may implement any well-known communications techniques and protocols, such as techniques suitable for use with packet-switched networks (e.g., public networks such as the Internet, private networks such as an enterprise intranet, and so forth), circuit-switched networks (e.g., the public switched telephone network), or a combination of packet-switched networks and circuit-switched networks (with suitable gateways and translators). The communications component 840 may include various types of standard communication elements, such as one or more communications interfaces, network interfaces, network interface cards (NIC), radios, wireless transmitters/receivers (transceivers), wired and/or wireless communication media, physical connectors, and so forth. By way of example, and not limitation, communication media 812, 842 include wired communications media and wireless communications media. Examples of wired communications media may include a wire, cable, metal leads, printed circuit boards (PCB), backplanes, switch fabrics, semiconductor material, twisted-pair wire, co-axial cable, fiber optics, a propagated signal, and so forth. Examples of wireless communications media may include acoustic, radio-frequency (RF) spectrum, infrared and other wireless media.

The device 820 may communicate with other devices 810, 850 over a communications media 812, 842, respectively, using communications signals 814, 844, respectively, via the communications component 840. The devices 810, 850 may be internal or external to the device 820 as desired for a given implementation.

Device 810 may generally correspond to client device 120 used by a user of an application 140, such as a first player of a multiplayer game. Device 850 may generally correspond to device 420 used by a user of an application 140, such as a second player of a multiplayer game. Signals 814 and 844 sent over media 812 and 842 may therefore correspond to the transmission of text command 125, image 150, image 350, message 425, message 435, message 525, image 550, image 610, and image 660 between the application system 110 and devices 810 and 850.

Figure 9:
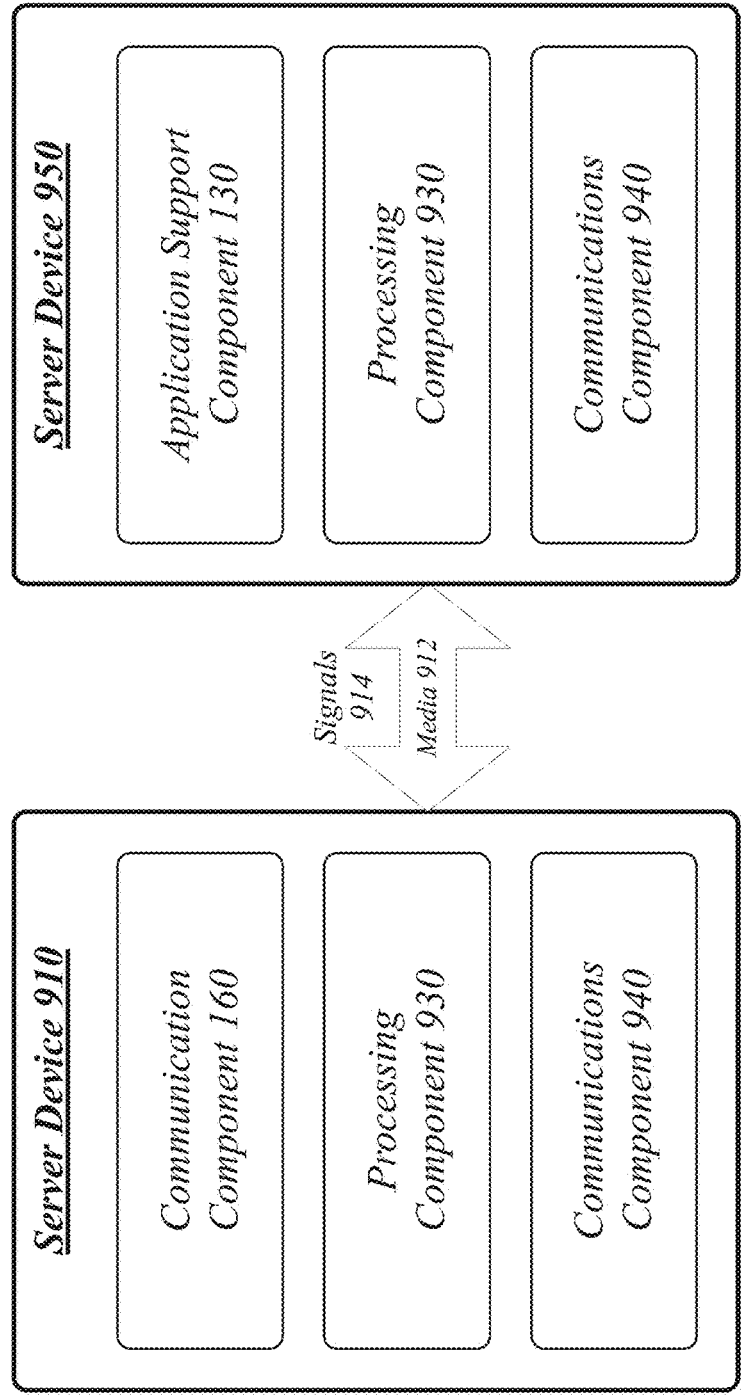
FIG. 9 illustrates an embodiment of a distributed system for the application system of FIG. 1.

FIG. 9 illustrates a block diagram of a distributed system 900. The distributed system 900 may distribute portions of the structure and/or operations for the application system 110 across multiple computing entities. Examples of distributed system 900 may include without limitation a client-server architecture, a 3-tier architecture, an N-tier architecture, a tightly-coupled or clustered architecture, a peer-to-peer architecture, a master-slave architecture, a shared database architecture, and other types of distributed systems. The embodiments are not limited in this context.

The distributed system 900 may comprise a client device 910 and a server device 950. In general, the client device 910 and the server device 950 may be the same or similar to the client device 820 as described with reference to FIG. 8. For instance, the client system 910 and the server system 950 may each comprise a processing component 930 and a communications component 940 which are the same or similar to the processing component 830 and the communications component 840, respectively, as described with reference to FIG. 8. In another example, the devices 910, 950 may communicate over a communications media 912 using communications signals 914 via the communications components 940.

The server device 910 may comprise or employ one or more programs that operate to perform various methodologies in accordance with the described embodiments. In one embodiment, for example, the server device 910 may implement the communication component 160. The communication component 160 may receive and send messages on behalf of the application system 110. The communication component 160 may be part of messaging system 170. Communication component 160 may be operative to receive a plurality of messages intended for a plurality of users and to identify those messages which are between users being served by one of a plurality of applications supported by application support component 130. Communication component 160 may be operative to examine these messages to see if they correspond to a text command 125 for an application 140 currently being used by sender and recipient of the messages. Where such correspondence exists, the communication component 160 may be operative to transmit the text command 125 to the application support component 130 as signals 914 over media 912, to receive an image 150 in response, and to replace the text command 125 with the image 150 before forwarding the message to its recipient.

The server device 950 may comprise or employ one or more programs that operate to perform various methodologies in accordance with the described embodiments. In one embodiment, for example, the client device 910 may implement the application support component 130. Server device 910 may host and support a plurality of applications using application support component 130. Application support component 130 may be operative to receive a text command 125 from the communication component 160 as signals 914 over media 912, to process the text command 125 to produce the image 150, and to transmit the image 150 to the communication component 160 to replace text command 125 for forwarding to its recipient.

Included herein is a set of flow charts representative of exemplary methodologies for performing novel aspects of the disclosed architecture. While, for purposes of simplicity of explanation, the one or more methodologies shown herein, for example, in the form of a flow chart or flow diagram, are shown and described as a series of acts, it is to be understood and appreciated that the methodologies are not limited by the order of acts, as some acts may, in accordance therewith, occur in a different order and/or concurrently with other acts from that shown and described herein. For example, those skilled in the art will understand and appreciate that a methodology could alternatively be represented as a series of interrelated states or events, such as in a state diagram. Moreover, not all acts illustrated in a methodology may be required for a novel implementation.

Figure 10:
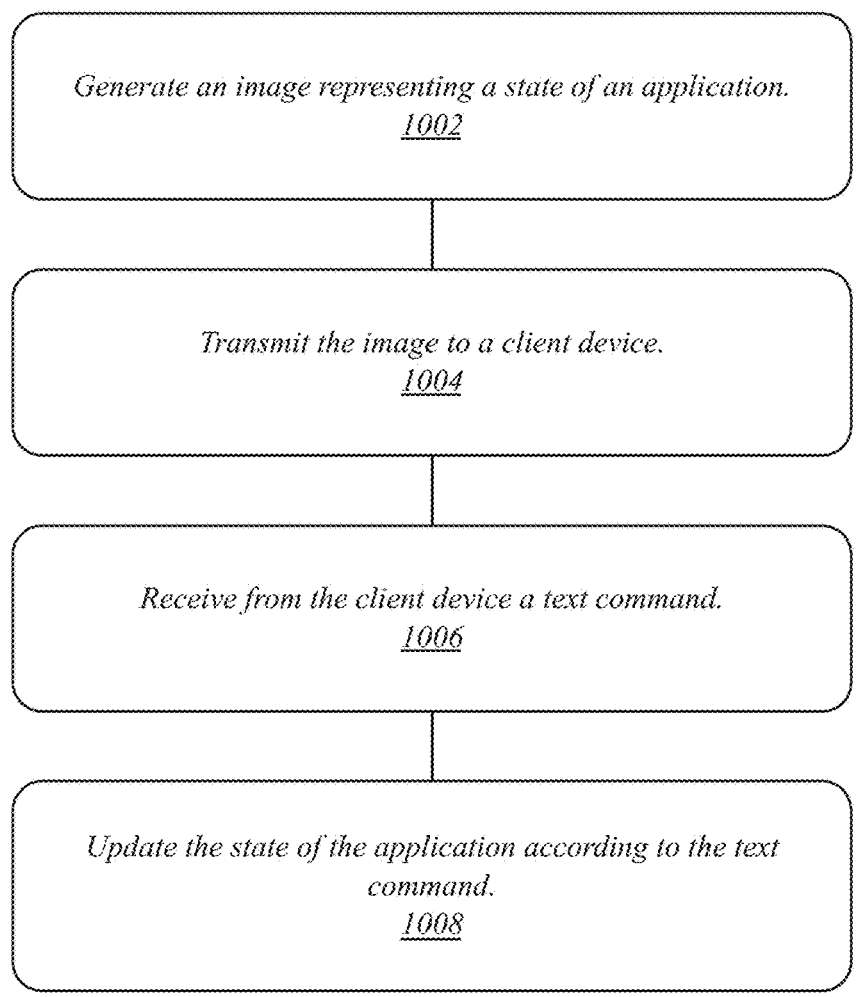
FIG. 10 illustrates an embodiment of a logic flow for the system of FIG. 1.

FIG. 10 illustrates one embodiment of a logic flow 1000. The logic flow 1000 may be representative of some or all of the operations executed by one or more embodiments described herein.

In the illustrated embodiment shown in FIG. 10, the logic flow 1000 may generate an image 150 representing a state of an application 140 at block 1002. Each application 140 may include a module, routine, function, or other programming element operative to request a rendering of the current state of the application 140. The logic flow 1000 may initiate the image-request function to generate the image 150. In some embodiments, the application 140 may comprise a game, such as a single-player game, a multiplayer game, a turn-based game, or any other type of game. The generated image 150 may include a legend 250 visually indicating a set of available commands. The generated image 150 may include a visual indication of the current players in the game, such as by including their avatars. The generated image 150 may include a visual indication of the most recent play made in the game.

The logic flow 1000 may transmit the image 150 to a client device 120 at block 1004. Transmitting the image 150 may comprise submitting a message to a messaging system 170, the messaging comprising the image 150, such as by including the image 150 as an attachment.

The logic flow 1000 may receive from the client device 120 a text command 125 at block 1006. The text command 125 may be received via the messaging system 170 as a message 425. The logic flow 1000 may determine that the message 425 comprises the text command 125, receive a second message 435 from the client device 120 via the messaging system 170, determine that the second message 435 does not correspond to the set of available commands, and forward the second message 435 to a second client device 420 via the messaging system. The second client device 420 may be a device used by a second player of a multiplayer game implemented by application 140.

The logic flow 1000 may update the state of the application 140 according to the text command 125 at block 1008. Each application 140 may include a module, routine, function, or other programming element operative to input a text command 125 to the application 140. The logic flow 1000 may initiate the input function to initiate the update to the state of application 140.

The embodiments are not limited to this example.

Figure 11:
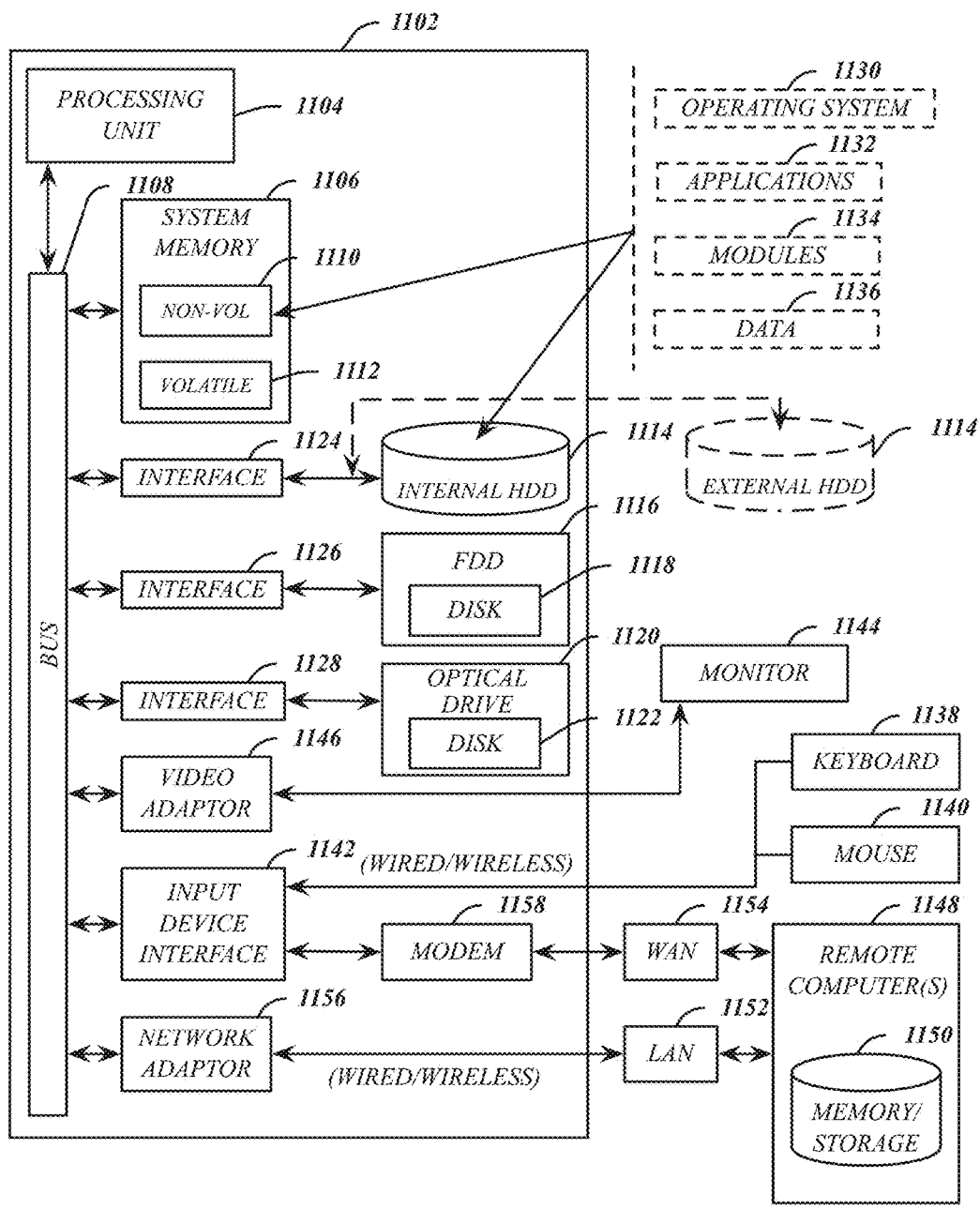
FIG. 11 illustrates an embodiment of a computing architecture.

FIG. 11 illustrates an embodiment of an exemplary computing architecture 1100 suitable for implementing various embodiments as previously described. In one embodiment, the computing architecture 1100 may comprise or be implemented as part of an electronic device. Examples of an electronic device may include those described with reference to FIG. 8, among others. The embodiments are not limited in this context.

As used in this application, the terms "system" and "component" are intended to refer to a computer-related entity, either hardware, a combination of hardware and software, software, or software in execution, examples of which are provided by the exemplary computing architecture 1100. For example, a component can be, but is not limited to being, a process running on a processor, a processor, a hard disk drive, multiple storage drives (of optical and/or magnetic storage medium), an object, an executable, a thread of execution, a program, and/or a computer. By way of illustration, both an application running on a server and the server can be a component. One or more components can reside within a process and/or thread of execution, and a component can be localized on one computer and/or distributed between two or more computers. Further, components may be communicatively coupled to each other by various types of communications media to coordinate operations. The coordination may involve the uni-directional or bi-directional exchange of information. For instance, the components may communicate information in the form of signals communicated over the communications media. The information can be implemented as signals allocated to various signal lines. In such allocations, each message is a signal. Further embodiments, however, may alternatively employ data messages. Such data messages may be sent across various connections. Exemplary connections include parallel interfaces, serial interfaces, and bus interfaces.

The computing architecture 1100 includes various common computing elements, such as one or more processors, multi-core processors, co-processors, memory units, chipsets, controllers, peripherals, interfaces, oscillators, timing devices, video cards, audio cards, multimedia input/output (I/O) components, power supplies, and so forth. The embodiments, however, are not limited to implementation by the computing architecture 1100.

As shown in FIG. 11, the computing architecture 1100 comprises a processing unit 1104, a system memory 1106 and a system bus 1108. The processing unit 1104 can be any of various commercially available processors, including without limitation an AMD® Athlon®, Duron® and Opteron® processors; ARM® application, embedded and secure processors; IBM® and Motorola® DragonBall® and PowerPC® processors; IBM and Sony® Cell processors; Intel® Celeron®, Core (2) Duo®, Itanium®, Pentium®, Xeon®, and XScale® processors; and similar processors. Dual microprocessors, multi-core processors, and other multi-processor architectures may also be employed as the processing unit 1104.

The system bus 1108 provides an interface for system components including, but not limited to, the system memory 1106 to the processing unit 1104. The system bus 1108 can be any of several types of bus structure that may further interconnect to a memory bus (with or without a memory controller), a peripheral bus, and a local bus using any of a variety of commercially available bus architectures. Interface adapters may connect to the system bus 1108 via a slot architecture. Example slot architectures may include without limitation Accelerated Graphics Port (AGP), Card Bus, (Extended) Industry Standard Architecture ((E)ISA), Micro Channel Architecture (MCA), NuBus, Peripheral Component Interconnect (Extended) (PCI(X)), PCI Express, Personal Computer Memory Card International Association (PCMCIA), and the like.

The computing architecture 1100 may comprise or implement various articles of manufacture. An article of manufacture may comprise a computer-readable storage medium to store logic. Examples of a computer-readable storage medium may include any tangible media capable of storing electronic data, including volatile memory or non-volatile memory, removable or non-removable memory, erasable or non-erasable memory, writeable or re-writeable memory, and so forth. Examples of logic may include executable computer program instructions implemented using any suitable type of code, such as source code, compiled code, interpreted code, executable code, static code, dynamic code, object-oriented code, visual code, and the like. Embodiments may also be at least partly implemented as instructions contained in or on a non-transitory computer-readable medium, which may be read and executed by one or more processors to enable performance of the operations described herein.

The system memory 1106 may include various types of computer-readable storage media in the form of one or more higher speed memory units, such as read-only memory (ROM), random-access memory (RAM), dynamic RAM (DRAM), Double-Data-Rate DRAM (DDRAM), synchronous DRAM (SDRAM), static RAM (SRAM), programmable ROM (PROM), erasable programmable ROM (EPROM), electrically erasable programmable ROM (EEPROM), flash memory, polymer memory such as ferroelectric polymer memory, ovonic memory, phase change or ferroelectric memory, silicon-oxide-nitride-oxide-silicon (SONOS) memory, magnetic or optical cards, an array of devices such as Redundant Array of Independent Disks (RAID) drives, solid state memory devices (e.g., USB memory, solid state drives (SSD) and any other type of storage media suitable for storing information. In the illustrated embodiment shown in FIG. 11, the system memory 1106 can include non-volatile memory 1110 and/or volatile memory 1112. A basic input/output system (BIOS) can be stored in the non-volatile memory 1110.

The computer 1102 may include various types of computer-readable storage media in the form of one or more lower speed memory units, including an internal (or external) hard disk drive (HDD) 1114, a magnetic floppy disk drive (FDD) 1116 to read from or write to a removable magnetic disk 1118, and an optical disk drive 1120 to read from or write to a removable optical disk 1122 (e.g., a CD-ROM or DVD). The HDD 1114, FDD 1116 and optical disk drive 1120 can be connected to the system bus 1108 by a HDD interface 1124, an FDD interface 1126 and an optical drive interface 1128, respectively. The HDD interface 1124 for external drive implementations can include at least one or both of Universal Serial Bus (USB) and IEEE 1394 interface technologies.

The drives and associated computer-readable media provide volatile and/or nonvolatile storage of data, data structures, computer-executable instructions, and so forth. For example, a number of program modules can be stored in the drives and memory units 1110, 1112, including an operating system 1130, one or more application programs 1132, other program modules 1134, and program data 1136. In one embodiment, the one or more application programs 1132, other program modules 1134, and program data 1136 can include, for example, the various applications and/or components of the application system 110.

A user can enter commands and information into the computer 1102 through one or more wire/wireless input devices, for example, a keyboard 1138 and a pointing device, such as a mouse 1140. Other input devices may include microphones, infra-red (IR) remote controls, radio-frequency (RF) remote controls, game pads, stylus pens, card readers, dongles, finger print readers, gloves, graphics tablets, joysticks, keyboards, retina readers, touch screens (e.g., capacitive, resistive, etc.), trackballs, trackpads, sensors, styluses, and the like. These and other input devices are often connected to the processing unit 1104 through an input device interface 1142 that is coupled to the system bus 1108, but can be connected by other interfaces such as a parallel port, IEEE 1394 serial port, a game port, a USB port, an IR interface, and so forth.

A monitor 1144 or other type of display device is also connected to the system bus 1108 via an interface, such as a video adaptor 1146. The monitor 1144 may be internal or external to the computer 1102. In addition to the monitor 1144, a computer typically includes other peripheral output devices, such as speakers, printers, and so forth.

The computer 1102 may operate in a networked environment using logical connections via wire and/or wireless communications to one or more remote computers, such as a remote computer 1148. The remote computer 1148 can be a workstation, a server computer, a router, a personal computer, portable computer, microprocessor-based entertainment appliance, a peer device or other common network node, and typically includes many or all of the elements described relative to the computer 1102, although, for purposes of brevity, only a memory/storage device 1150 is illustrated. The logical connections depicted include wire/wireless connectivity to a local area network (LAN) 1152 and/or larger networks, for example, a wide area network (WAN) 1154. Such LAN and WAN networking environments are commonplace in offices and companies, and facilitate enterprise-wide computer networks, such as intranets, all of which may connect to a global communications network, for example, the Internet.

When used in a LAN networking environment, the computer 1102 is connected to the LAN 1152 through a wire and/or wireless communication network interface or adaptor 1156. The adaptor 1156 can facilitate wire and/or wireless communications to the LAN 1152, which may also include a wireless access point disposed thereon for communicating with the wireless functionality of the adaptor 1156.

When used in a WAN networking environment, the computer 1102 can include a modem 1158, or is connected to a communications server on the WAN 1154, or has other means for establishing communications over the WAN 1154, such as by way of the Internet. The modem 1158, which can be internal or external and a wire and/or wireless device, connects to the system bus 1108 via the input device interface 1142. In a networked environment, program modules depicted relative to the computer 1102, or portions thereof, can be stored in the remote memory/storage device 1150. It will be appreciated that the network connections shown are exemplary and other means of establishing a communications link between the computers can be used.

The computer 1102 is operable to communicate with wire and wireless devices or entities using the IEEE 802 family of standards, such as wireless devices operatively disposed in wireless communication (e.g., IEEE 802.11 over-the-air modulation techniques). This includes at least Wi-Fi (or Wireless Fidelity), WiMax, and Bluetooth™ wireless technologies, among others. Thus, the communication can be a predefined structure as with a conventional network or simply an ad hoc communication between at least two devices. Wi-Fi networks use radio technologies called IEEE 802.11x (a, b, g, n, etc.) to provide secure, reliable, fast wireless connectivity. A Wi-Fi network can be used to connect computers to each other, to the Internet, and to wire networks (which use IEEE 802.3-related media and functions).

Figure 12:
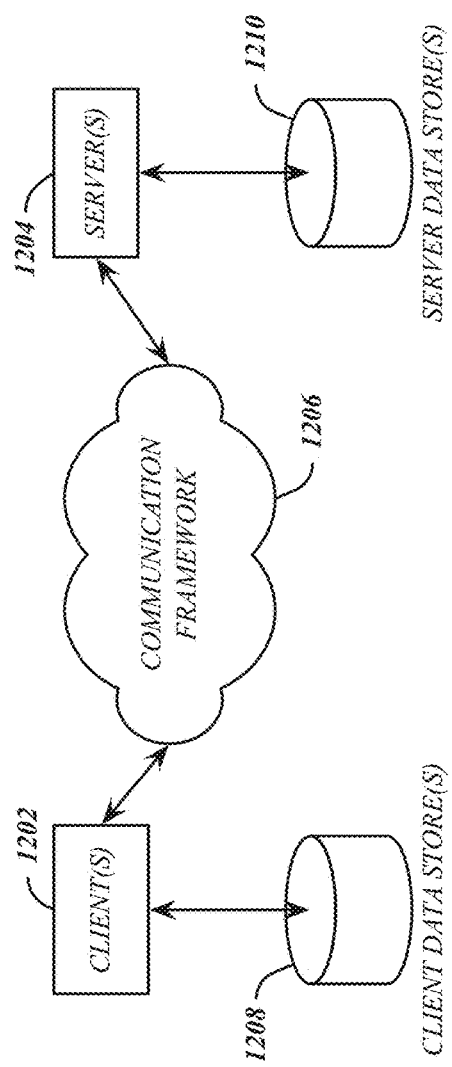
FIG. 12 illustrates an embodiment of a communications architecture.

FIG. 12 illustrates a block diagram of an exemplary communications architecture 1200 suitable for implementing various embodiments as previously described. The communications architecture 1200 includes various common communications elements, such as a transmitter, receiver, transceiver, radio, network interface, baseband processor, antenna, amplifiers, filters, power supplies, and so forth. The embodiments, however, are not limited to implementation by the communications architecture 1200.

As shown in FIG. 12, the communications architecture 1200 comprises includes one or more clients 1202 and servers 1204. The clients 1202 may implement the client device 910. The servers 1204 may implement the server device 950. The clients 1202 and the servers 1204 are operatively connected to one or more respective client data stores 1208 and server data stores 1210 that can be employed to store information local to the respective clients 1202 and servers 1204, such as cookies and/or associated contextual information.

The clients 1202 and the servers 1204 may communicate information between each other using a communication framework 1206. The communications framework 1206 may implement any well-known communications techniques and protocols. The communications framework 1206 may be implemented as a packet-switched network (e.g., public networks such as the Internet, private networks such as an enterprise intranet, and so forth), a circuit-switched network (e.g., the public switched telephone network), or a combination of a packet-switched network and a circuit-switched network (with suitable gateways and translators).

The communications framework 1206 may implement various network interfaces arranged to accept, communicate, and connect to a communications network. A network interface may be regarded as a specialized form of an input output interface. Network interfaces may employ connection protocols including without limitation direct connect, Ethernet (e.g., thick, thin, twisted pair 10/100/1000 Base T, and the like), token ring, wireless network interfaces, cellular network interfaces, IEEE 802.11a-x network interfaces, IEEE 802.16 network interfaces, IEEE 802.20 network interfaces, and the like. Further, multiple network interfaces may be used to engage with various communications network types. For example, multiple network interfaces may be employed to allow for the communication over broadcast, multicast, and unicast networks. Should processing requirements dictate a greater amount speed and capacity, distributed network controller architectures may similarly be employed to pool, load balance, and otherwise increase the communicative bandwidth required by clients 1202 and the servers 1204. A communications network may be any one and the combination of wired and/or wireless networks including without limitation a direct interconnection, a secured custom connection, a private network (e.g., an enterprise intranet), a public network (e.g., the Internet), a Personal Area Network (PAN), a Local Area Network (LAN), a Metropolitan Area Network (MAN), an Operating Missions as Nodes on the Internet (OMNI), a Wide Area Network (WAN), a wireless network, a cellular network, and other communications networks.

Some embodiments may be described using the expression "one embodiment" or "an embodiment" along with their derivatives. These terms mean that a particular feature, structure, or characteristic described in connection with the embodiment is included in at least one embodiment. The appearances of the phrase "in one embodiment" in various places in the specification are not necessarily all referring to the same embodiment. Further, some embodiments may be described using the expression "coupled" and "connected" along with their derivatives. These terms are not necessarily intended as synonyms for each other. For example, some embodiments may be described using the terms "connected" and/or "coupled" to indicate that two or more elements are in direct physical or electrical contact with each other. The term "coupled," however, may also mean that two or more elements are not in direct contact with each other, but yet still co-operate or interact with each other.

With general reference to notations and nomenclature used herein, the detailed descriptions herein may be presented in terms of program procedures executed on a computer or network of computers. These procedural descriptions and representations are used by those skilled in the art to most effectively convey the substance of their work to others skilled in the art.

A procedure is here, and generally, conceived to be a self-consistent sequence of operations leading to a desired result. These operations are those requiring physical manipulations of physical quantities. Usually, though not necessarily, these quantities take the form of electrical, magnetic or optical signals capable of being stored, transferred, combined, compared, and otherwise manipulated. It proves convenient at times, principally for reasons of common usage, to refer to these signals as bits, values, elements, symbols, characters, terms, numbers, or the like. It should be noted, however, that all of these and similar terms are to be associated with the appropriate physical quantities and are merely convenient labels applied to those quantities.

Further, the manipulations performed are often referred to in terms, such as adding or comparing, which are commonly associated with mental operations performed by a human operator. No such capability of a human operator is necessary, or desirable in most cases, in any of the operations described herein which form part of one or more embodiments. Rather, the operations are machine operations. Useful machines for performing operations of various embodiments include general purpose digital computers or similar devices.

Various embodiments also relate to apparatus or systems for performing these operations. This apparatus may be specially constructed for the required purpose or it may comprise a general purpose computer as selectively activated or reconfigured by a computer program stored in the computer. The procedures presented herein are not inherently related to a particular computer or other apparatus. Various general purpose machines may be used with programs written in accordance with the teachings herein, or it may prove convenient to construct more specialized apparatus to perform the required method steps. The required structure for a variety of these machines will appear from the description given.

It is emphasized that the Abstract of the Disclosure is provided to allow a reader to quickly ascertain the nature of the technical disclosure. It is submitted with the understanding that it will not be used to interpret or limit the scope or meaning of the claims. In addition, in the foregoing Detailed Description, it can be seen that various features are grouped together in a single embodiment for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separate embodiment. In the appended claims, the terms "including" and "in which" are used as the plain-English equivalents of the respective terms "comprising" and "wherein," respectively. Moreover, the terms "first," "second," "third," and so forth, are used merely as labels, and are not intended to impose numerical requirements on their objects.

What has been described above includes examples of the disclosed architecture. It is, of course, not possible to describe every conceivable combination of components and/or methodologies, but one of ordinary skill in the art may recognize that many further combinations and permutations are possible. Accordingly, the novel architecture is intended to embrace all such alterations, modifications and variations that fall within the spirit and scope of the appended claims.

What is claimed is:

1. A computer-implemented method, comprising:
   providing a messaging service at a messaging system comprising a processing unit, the messaging service configured to exchange interpersonal communications between two or more users of the messaging service;
   receiving, by the messaging system, a first message from a first client device associated with a first user of the messaging service, the first message comprising a command that affects a state of an application supported by an application system and transmitted over a first messaging channel of the messaging system;
   transmitting the first message to a communication component of the application system;
   receiving, by the messaging system, a second message from the first client, the second message comprising text that does not correspond to a command associated with the application, the second message received on the same first messaging channel of the messaging system that received the command affecting the state of the application;
   receiving a third message comprising a representation of an updated state of the application; and
   transmitting the third message to a second client device associated with the application system, the second client device associated with a second user of the messaging service.

2. The method of claim 1, wherein the representation of the updated state of the application comprises an image.

3. The method of claim 2, wherein the image comprises an avatar associated with the first client device.

4. The method of claim 2, wherein the image is received at the messaging system as an image attachment to the second message.

5. The method of claim 1, wherein the representation of the updated state of the application includes a representation of a change in state of the application resulting from the command.

6. The method of claim 1, wherein the representation of the updated state of the application comprises a legend of available commands.

7. A non-transitory computer-readable medium storing:
   instructions configured to cause a processor to provide a messaging service at a messaging system comprising a processing unit, the messaging service configured to exchange interpersonal communications between two or more users of the messaging service;
   instructions configured to cause the processor to receive, by the messaging system, a first message from a first client device associated with a first user of the messaging service, the first message comprising a command that affects a state of an application supported by an application system;
   instructions configured to cause the processor to transmit the first message to a communication component of the application system;
   instructions configured to cause the processor to receive, by the messaging system, a second message from the first client, the second message comprising text that does not correspond to a command associated with the application, the second message received on the same first messaging channel of the messaging system that received the command affecting the state of the application;

instructions configured to cause the processor to receive a third message comprising a representation of an updated state of the application; and instructions configured to cause the processor to transmit the third message to a second client device associated with the application system, the second client device associated with a second user of the messaging service.

8. The medium of claim 7, wherein the representation of the updated state of the application comprises an image.

9. The medium of claim 8, wherein the image comprises an avatar associated with the first client device.

10. The medium of claim 8, wherein the image is received at the messaging system as an image attachment to the second message.

11. The medium of claim 7, wherein the representation of the updated state of the application includes a representation of a change in state of the application resulting from the command.

12. The medium of claim 7, wherein the representation of the updated state of the application comprises a legend of available commands.

13. A system, comprising:
a processing circuit;
messaging service logic executable on the processing circuit and configured to provide a messaging service at a messaging system, the messaging service configured to exchange interpersonal communications between two or more users of the messaging service;
a network receiver configured to receive a first message from a first client device associated with a first user of the messaging service, the first message comprising a command that affects a state of an application supported by an application system; and
a network transmitter configured to transmit the first message to a communication component of the application system; wherein
the network receiver is further configured to receive, by the messaging system, a second message from the first client, the second message comprising text that does not correspond to a command associated with the application, the second message received on the same first messaging channel of the messaging system that received the command affecting the state of the application;
the network receiver is further configured to receive a third message comprising a representation of an updated state of the application, and
the network transmitter is further configured to transmit the third message to a second client device associated with the application system, the second client device associated with a second user of the messaging service.

14. The system of claim 13, wherein the representation of the updated state of the application comprises an image.

15. The system of claim 14, wherein the image comprises an avatar associated with the first client device.

16. The system of claim 14, wherein the image is received at the messaging system as an image attachment to the second message.

17. The system of claim 13, wherein the representation of the updated state of the application includes a representation of a change in state of the application resulting from the command.

* * * * *